US012637111B2

(12) United States Patent
Grimm et al.

(10) Patent No.: US 12,637,111 B2
(45) Date of Patent: May 26, 2026

(54) METHOD FOR TRAJECTORY PREDICTION, METHOD FOR CONTROLLING AN EGO VEHICLE

(71) Applicant: Robert Bosch GmbH, Stuttgart (DE)

(72) Inventors: Daniel Grimm, Karlsruhe (DE);
Alexander Naumann, Karlsruhe (DE);
Felix Hertlein, Karlsruhe (DE);
Juergen Luettin, Renningen (DE);
Maximilian Zipfl, Karlsruhe (DE);
Achim Rettinger, Trier (DE); Lavdim Halilaj, Leonberg (DE); Marius Zoellner, Karlsruhe (DE); Stefan Schmid, Waiblingen (DE); Steffen Thoma, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 86 days.

(21) Appl. No.: 18/828,095

(22) Filed: Sep. 9, 2024

(65) Prior Publication Data

US 2025/0100586 A1     Mar. 27, 2025

(30) Foreign Application Priority Data

Sep. 26, 2023    (DE) ..................... 10 2023 209 411.8

(51) Int. Cl.
*B60W 60/00* (2020.01)
*B60W 50/00* (2006.01)
*G06N 3/02* (2006.01)

(52) U.S. Cl.
CPC .. *B60W 60/00274* (2020.02); *B60W 50/0097* (2013.01); *G06N 3/02* (2013.01);
(Continued)

(58) Field of Classification Search
CPC ....... B60W 60/00274; B60W 50/0097; B60W 2554/4041; B60W 2552/53;
(Continued)

(56) References Cited

U.S. PATENT DOCUMENTS 11,975,726 B1 *  5/2024  Gu .......................... G06N 3/044
2012/0121161 A1 *  5/2012  Eade ..................... G06F 16/444
                                                        901/1
(Continued)

FOREIGN PATENT DOCUMENTS

DE     102020129072 A1     8/2021
DE     102020132559 A1     12/2021
(Continued)

OTHER PUBLICATIONS

Grimm et al. "Holistic Graph-based Motion Prediction," arXiv (2023); pp. 1-8.
(Continued)

*Primary Examiner* — Tuan C To
(74) *Attorney, Agent, or Firm* — NORTON ROSE FULBRIGHT US LLP

(57)    ABSTRACT

A computer-implemented method for trajectory prediction. The method includes: receiving trajectory data of motion trajectories of road users arranged in a surrounding area of the ego vehicle by a prediction module, wherein the trajectory data are arranged in a graph representation; receiving map data of a map representation mapping the surrounding area of the ego vehicle by the prediction module; generating an interaction graph representation for the plurality of road users based on the trajectory data of the road users and roadway location information of the map representation by the prediction module; and predicting a future motion trajectory to be executed for at least one other road user based on the trajectory data, the map data, and the interaction
(Continued)

graph representation of the road users by the prediction module.

15 Claims, 5 Drawing Sheets

(52) U.S. Cl.
CPC . *B60W 2552/53* (2020.02); *B60W 2554/4041* (2020.02); *B60W 2554/4045* (2020.02); *B60W 2556/40* (2020.02)

(58) Field of Classification Search
CPC ...... B60W 2556/40; B60W 2554/4045; G06N 3/02; G01C 22/00; G01C 21/3476; G01C 21/30; B25H 7/04; G06T 2207/30204; G08G 1/167; B60Y 2300/08
USPC .......................................................... 701/25
See application file for complete search history.

(56) References Cited

U.S. PATENT DOCUMENTS

| | | | |
|---|---|---|---|
| 2019/0152490 A1 | 5/2019 | Lan et al. | |
| 2021/0232913 A1 | 7/2021 | Martin et al. | |
| 2023/0219796 A1* | 7/2023 | Gottin ................... | B66F 17/003 |
| | | | 340/686.6 |
| 2024/0208546 A1* | 6/2024 | Pronovost ......... | B60W 60/0027 |

FOREIGN PATENT DOCUMENTS

| | | | |
|---|---|---|---|
| DE | 102022209034 A1 | 2/2024 | |
| EP | 3073460 A1 * | 9/2016 | ............ H04W 4/024 |
| EP | 3872519 A1 * | 9/2021 | ............... G06N 7/01 |
| WO | 2022231519 A1 | 11/2022 | |

OTHER PUBLICATIONS

Zipfl et al. "Relation-based Motion Prediction using Traffic Scene Graphs," arXiv (2022); pp. 1-7.

* cited by examiner

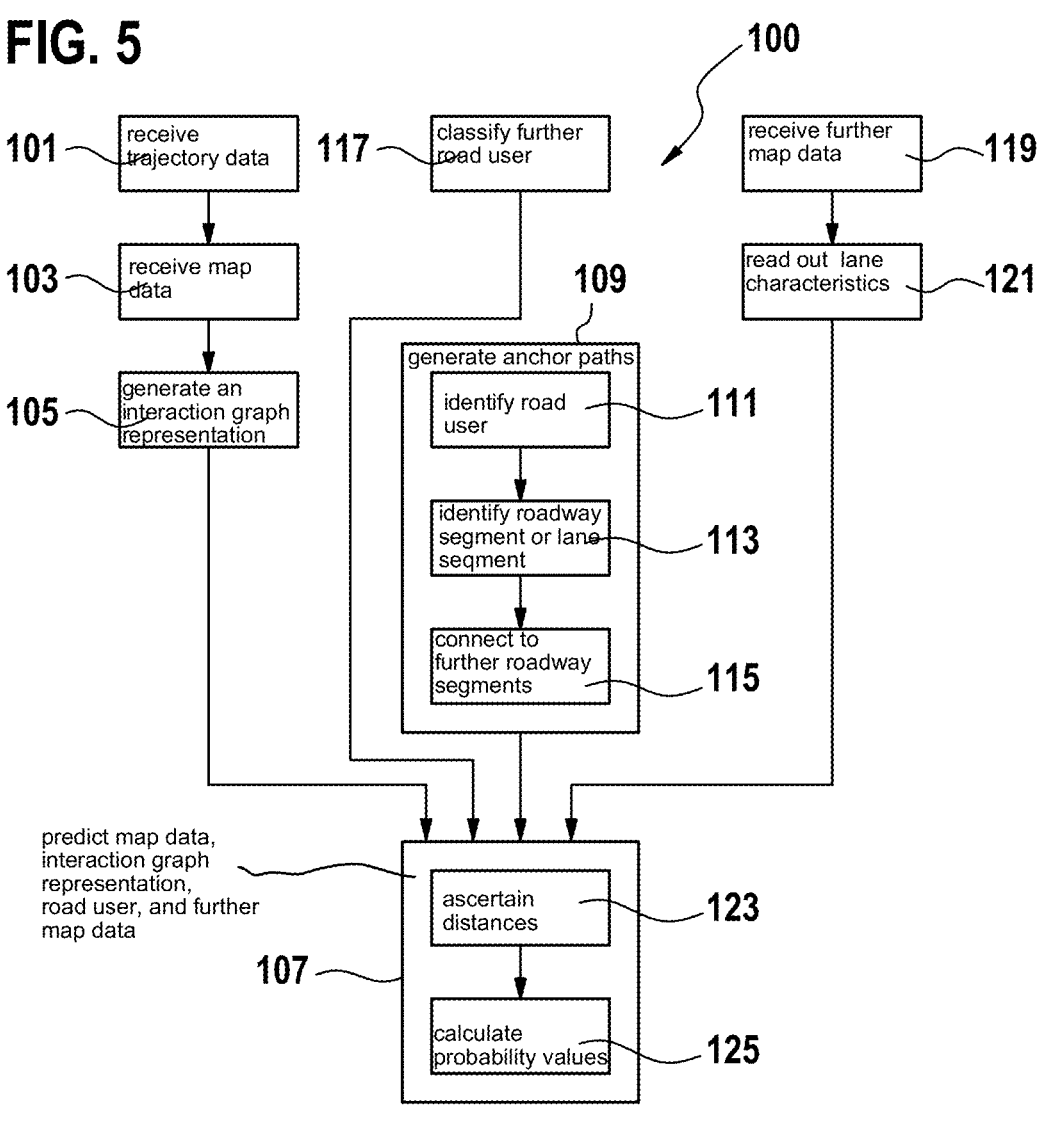

101 — receive trajectory data

117 — classify further road user

100

119 — receive further map data

103 — receive map data

121 — read out lane characteristics

105 — generate an interaction graph representation

109 generate anchor paths

111 — identify road user

113 — identify roadway segment or lane seqment

115 — connect to further roadway segments predict map data, interaction graph representation, road user, and further map data

107

123 — ascertain distances

125 — calculate probability values

FIG. 6

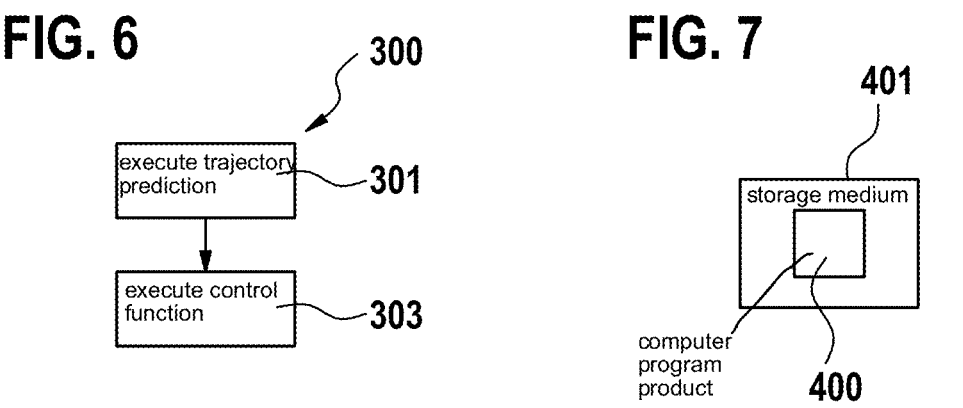

300

301 — execute trajectory prediction

303 — execute control function

FIG. 7

401 storage medium

400 computer program product

METHOD FOR TRAJECTORY PREDICTION, METHOD FOR CONTROLLING AN EGO VEHICLE

CROSS REFERENCE

The present application claims the benefit under 35 U.S.C. § 119 of German Patent Application No. DE 10 2023 209 411.8 filed on Sep. 26, 2023, which is expressly incorporated herein by reference in its entirety.

FIELD

The present invention relates to a method for trajectory prediction and a method for controlling an ego vehicle.

BACKGROUND INFORMATION

Methods for trajectory prediction and methods for controlling an ego vehicle are described in the related art.

SUMMARY

It is an object to provide an improved method for trajectory prediction and an improved method for controlling an ego vehicle.

The object may be achieved by methods which include features of the present invention. Advantageous example embodiments of the present invention are disclosed herein.

According to one aspect of the present invention, a computer-implemented method for trajectory prediction is provided. According to an example embodiment of the present invention, the method comprises the following:

Receiving trajectory data of motion trajectories of road users arranged in a surrounding area of the ego vehicle by a prediction module, wherein the trajectory data are arranged in a graph representation, wherein nodes of the graph representation comprise position information and/or speed information of the road users, and wherein edges of the graph representation define temporal relations between the position information and/or speed information of the road users;

receiving map data of a map representation mapping the surrounding area of the ego vehicle by the prediction module, wherein the map data are arranged in a graph representation, wherein nodes of the graph representation comprise position information of a roadway boundary element of a roadway and/or lane used by the ego vehicle and/or by the other road users, and wherein edges of the graph representation define spatial relations between the position information of the roadway boundary element;

generating an interaction graph representation for the plurality of road users based on the trajectory data of the road users and roadway location information of the map representation by the prediction module, wherein each node of the interaction graph representation represents a road user positioned in the surrounding area of the ego vehicle and comprises position information and/or speed information of the road user, and wherein each edge of the interaction graph representation defines an arrangement relation between two of the road users represented by the nodes; and predicting a future motion trajectory to be executed for at least one other road user based on the trajectory data, the map data and the interaction graph representation of the road users by the prediction module.

This can achieve a technical advantage that an improved method for trajectory prediction can be provided. By taking into account the trajectory data and the map data in graph representation, the trajectory data and the map data can be used more easily as input data in the prediction module. Here, the graph representation has the advantage that it is geometrically invariant and does not require a predefined sequence or symmetry of the particular data entries. This simplifies the handling of the data.

By taking into account the trajectory data in combination with the map data, the trajectory prediction can also be made more precise. Here, the information from the trajectory data and the map data are combined to predict the motion trajectories.

According to an example embodiment of the present invention, the trajectory prediction can be made even more precise by taking into account the interaction graph representation. The interaction graph representation provides information with respect to relative arrangements of the individual road users relative to one another. By taking into account the relative arrangements of road users relative to one another, the trajectory prediction can be improved to the extent that interactions of road users among one another can be predicted and taken into account.

Here, the interactions concern the adjustment of a speed and/or the changing of a lane and/or driving lane of a road user due to the relative position of other road users to the particular road user. By taking into account these possible maneuvers of the road user caused by the relative arrangements of the other road users, the prediction of possible motion trajectories of the road user can be made more precise and thus improved.

The graph representation of the interactions in the form of the interaction graph representation also enables an easy handling of the data and a simple use of the interactions as input data for the prediction module.

According to one example embodiment of the present invention, the method further comprises:

Generating anchor paths based on the trajectory data of the road users and the map data of the map representation by the prediction module, wherein the anchor paths define regions on the roadways used by the road users in which possible motion trajectories can be arranged; and wherein the prediction of the motion data is effected based on the trajectory data, the map data, the interaction graph representation of the road users and/or the anchor paths.

This can achieve a technical advantage that the possible motion trajectories can be restricted to spatial regions by taking into account the anchor paths. Thus, all possible motion trajectories must run within the anchor paths according to the embodiment. By designing the anchor paths in such a way that they are limited to the courses of the particular roadways and/or lanes and are also compatible with the prevailing traffic rules, the possible motion trajectories can be limited to sensible regions of the roadways and/or lanes. Anchor paths are limited to the roadways or lanes open for use by traffic users. Anchor paths that take into account sidewalks and cycle paths are excluded. Thus, the prediction of motion trajectories that do not follow the particular courses of the roadways and/or lanes and/or do not comply with the prevailing traffic rules can be avoided.

According to one example embodiment of the present invention, generating anchor paths comprises the following: Localizing at least one road user on a roadway and/or lane by the prediction module;

identifying a roadway segment and/or lane segment of the roadway and/or lane on which the road user is positioned, wherein the roadway segment and/or lane segment defines a partial region of the roadway and/or lane, wherein the roadway segment and/or lane segment is bounded by roadway boundary elements of the roadway and/or lane boundary elements of the lane, wherein the roadway segment can be connected to further roadway segments and/or the lane segment can be connected to further roadway segments, and wherein a plurality of roadway segments forms the roadway and/or a plurality of lane segments forms the lane; and connecting the roadway segment and/or the lane segment to other roadway segments and/or lane segments that can be connected to one another to form the anchor path, taking into account prevailing traffic rules and the course of the roadway and/or lane.

This can achieve a technical advantage that a precise generation of anchor paths is enabled. By initially identifying the roadway segment and/or lane segment on which a road user is arranged for which a future motion trajectory is to be predicted, the particular anchor path is limited directly to the roadway and/or lane on which the particular road user is actually arranged. This ensures that a predicted motion trajectory is directly linked to the current position of the particular road user.

By generating the anchor path based on the particular roadway segment and/or lane segment, this is connected to other roadway segments and/or lane segments, so that the particular anchor path can be generated running along different roadways and/or lanes. In particular, a plurality of anchor paths can be generated for a road user, which start from the same roadway segment and/or lane segment and have different courses.

Here, the connecting of the various roadway segments and/or lane segments to the optional plurality of anchor paths is effected in such a way that the prevailing traffic rules are followed. The anchor paths generated in this way thus represent the spatial regions in which possible motion trajectories can be arranged.

This makes it possible to predict a plurality of possible motion trajectories that can be used by the road user in accordance with the prevailing traffic rules.

According to one example embodiment of the present invention, the anchor path comprises a roadway change and/or a lane change, provided that a roadway change and/or a lane change is compatible with the course of the roadway and/or lane and with prevailing traffic rules.

This can achieve a technical advantage that motion trajectories with roadway changes and/or lane changes can be predicted. As a result, the trajectory prediction can be made even more precise.

According to one example embodiment of the present invention, the method further comprises:

Classifying the other road users based on environmental sensor data of at least one ego vehicle by defining environmental detection as one of the following list: vehicle, bus, truck, streetcar, motorcyclist, cyclist, pedestrian, animal; and wherein anchor paths are generated only for road users, which are classified as vehicle, bus, truck, streetcar, motorcyclist.

This can achieve a technical advantage that the generation is executed exclusively for road users for whom anchor paths represent a sensible restriction of the particular possible motion trajectories. According to the present invention, anchor paths are limited to roadways and/or lanes. Anchor paths are therefore primarily useful for road users who move primarily or exclusively on roadways and/or lanes. Therefore, restricting the anchor paths to vehicles prevents the generation of anchor paths for road users for whom anchor paths are not a sensible restriction. Such road users are pedestrians, for example. As a result, the trajectory prediction is made even more precise.

According to one example embodiment of the present invention, the method further comprises:

Receiving further map data of a map representation mapping the surrounding area of the ego vehicle by the prediction module, wherein the further map data are designed as image data; and reading out of roadway characteristics of the roadways used by the road users from the map data by the prediction module;

wherein the prediction of the motion trajectories is effected based on the trajectory data, the map data and/or the interaction graph representation of the road users and/or the roadway characteristics.

This can achieve the technical advantage that additional information relevant to trajectory planning can be taken into account by taking into account the roadway characteristics. As a result, the precision of the trajectory prediction can be further increased, since, as a function of the formation of the particular roadway characteristics, the latter can have an influence on the behavior of road users.

Within the meaning of the application, roadway characteristics are properties of the roadway or lane that can have an influence on the behavior of the road user using the particular roadway or lane. Here, the behavior of the road user describes the behavior of the road user in road traffic and comprises the execution or non-execution of maneuvers and/or the way in which the road user executes the maneuvers as an action or reaction to the prevailing traffic.

According to one example embodiment of the present invention, the roadway characteristics comprise the following: stop lines, traffic signs, traffic lights, crosswalks, roadway environments, sidewalks, parking lots.

This can achieve the technical advantage that additional information relevant for the trajectory prediction can be taken into account by taking into account the roadway characteristics. All the roadway characteristics mentioned here can have a direct influence on the behavior of road users passing the roadway regions where such roadway characteristics are arranged. By taking into account the roadway characteristics, the behavior of road users and in particular the expected maneuvers of road users can be included in the trajectory prediction. As a result, the trajectory prediction can be made even more precise.

According to one example embodiment of the present invention, the arrangement relations of the edges of the interaction graph representation comprise lane information with respect to the road users, wherein the lane information comprises the following:

That a road user is positioned in the same lane as another road user and/or the ego vehicle; and/or that a road user is positioned in a lane adjacent to the lane of the other road user and/or the ego vehicle; and/or that a road user is positioned in a lane that crosses the lane of the other road user and/or the ego vehicle, and wherein the prediction of the motion trajectories is effected based on the trajectory data, the map data, the interaction graph representation of the road users and/or the roadway characteristics and/or the arrangement relations of the interaction graph representation.

This can achieve the technical advantage that a precise determination of the relative arrangements among road users is enabled. By assigning the various road users to the particular roadways and/or lanes, and by setting in relation the particular roadways and/or lanes between the various road users among one another in relation to their arrangements, possible interactions among the road users can be taken into account.

By taking into account the information that two road users are arranged one behind the other on the same roadway and/or lane or on different roadways and/or lanes next to one another or on two intersecting roadways and/or lanes, the corresponding behavior of the particular road users can be taken into account.

As a function of the arrangement of road users on the same roadway and/or lane, on roadways and/or lanes running next to one another or on intersecting roadways and/or lanes, the behavior of road users can be expected to be different but characteristic of the particular situations.

For example, if road users are arranged one behind the other on a roadway and/or lane, it can be expected that the faster road user behind in the direction of travel will reduce speed in the future or, if possible, change the roadway and/or lane.

On the other hand, road users in roadways and/or lanes arranged next to one another are not necessarily expected to reduce their speed or change the roadway and/or lane.

For road users on intersecting roadways and/or lanes, on the other hand, a reduction in speed when entering the intersection region of the roadways and/or lanes is a highly typical and thus probable behavior.

By taking into account the corresponding relative arrangement relations of the interaction graph representation, a further refinement of the trajectory prediction can thus be achieved.

According to one example embodiment of the present invention, predicting the motion trajectories comprises the following: Ascertaining for road users in the surrounding area of the ego vehicle distances of road users to other road users and/or to the ego vehicle based on the position information and the lane information of the interaction graph representation;

ascertaining probability values for collisions of road users among one another or with the ego vehicle based on the distances and speed information of the road users; and wherein the motion trajectories are effected taking into account the ascertained probability values.

This can achieve the technical advantage that the trajectory prediction can be further improved by ascertaining distances and the probability values for collisions among road users based on this. Here, it is assumed that road users will, to a certain probability, execute maneuvers in order to prevent such collisions. By taking into account such possible maneuvers, a more precise prediction of future motion trajectories of the particular road users can be achieved.

According to one example embodiment of the present invention, the nodes of the interaction graph representation comprise information with respect to the type of the particular road user, and wherein the type is defined as one of the following list: vehicle, bus, truck, motorcyclist, cyclist, pedestrian, animal.

This can achieve a technical advantage that the particular types can also be taken into account for determining the interactions among road users. This enables a further refinement of the trajectory prediction. The different types of road users usually exhibit different characteristic behaviors. By taking these into account, the trajectory prediction can be further improved.

According to one example embodiment of the present invention, the prediction module is designed as an artificial intelligence that is trained to execute the above-mentioned method steps, wherein the prediction module comprises a user level, a map level, a fusion level, a merger level and at least one encoder element, wherein the user level is configured to process the trajectory data and/or generate the interaction graph representation, wherein the map level is configured to process the map data, wherein the fusion level is configured to fuse results of the user level and the map level, wherein the at least one encoder element is configured to process the further map data designed as image data and to extract the roadway characteristics and/or lane characteristics from the map data, and wherein the merger level is configured to predict and output at least one motion trajectory of at least one road user based on results of the fusion level and results of the encoder element.

This can achieve a technical advantage that a powerful prediction module can be provided. In particular, the prediction module can be trained to execute the method steps described above. This enables a high degree of precision in trajectory prediction.

According to one example embodiment of the present invention, the artificial intelligence comprises at least one graph neural network, and/or wherein the encoder element is designed as an autoencoder and is configured to generate a latent space representation in a latent space of the roadway characteristics based on the image data of the further map data.

This can achieve ae technical advantage that a powerful prediction module can be provided. By designing the encoder element as an autoencoder, a precise and reliable encoding of the image information of the image data of the further map data in latent space representations can be achieved. This enables a precise processing of the image information of the further map data.

According to one aspect of the present invention, a method for controlling an ego vehicle is provided. According to an example embodiment of the present invention, the method includes the following:

Executing a trajectory prediction according to the method for trajectory prediction according to one of the above-described embodiments; and executing at least one control function of the ego vehicle, taking into account the predicted driving trajectory of the vehicle.

This can achieve a technical advantage that an improved method for controlling an ego vehicle, which is based on the improved trajectory prediction method with the above-mentioned technical advantages, can be provided.

According to one aspect of the present invention, a computing unit is provided, which is configured to execute the method for trajectory prediction according to one of the above-described embodiments and/or the method for controlling an ego vehicle, according to the present invention.

According to a further aspect of the present invention, a computer program product is provided, comprising commands that, when the program is executed by a data processing unit, cause the data processing unit to execute the method for trajectory prediction according to one of the above-described embodiments and/or the method for controlling an ego vehicle, according to the present invention.

Example embodiments of the present invention are described with reference to the figures.

BRIEF DESCRIPTION OF THE DRAWINGS

FIGS. 2A and 2B shows a schematic representation of an interaction graph representation according to one example embodiment of the present invention.

FIG. 5 shows a flow chart of a method for trajectory prediction, according to an example embodiment of the present invention.

FIG. 6 a flow chart of a method for controlling an ego-vehicle, according to an example embodiment of the present invention.

FIG. 7 shows a schematic representation of a computer program product, according to an example embodiment of the present invention.

DETAILED DESCRIPTION OF EXAMPLE EMBODIMENTS

Figure 1:
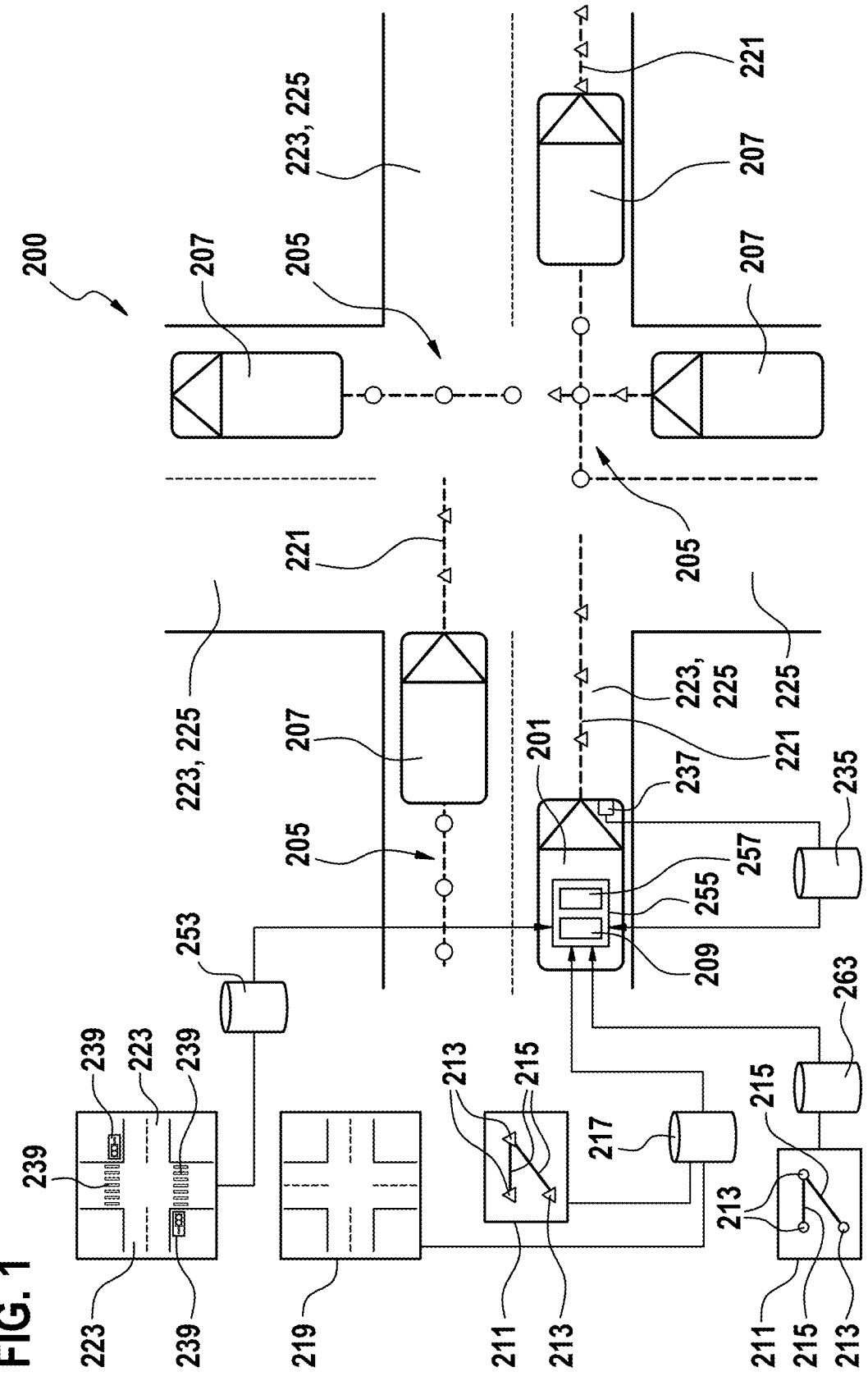
FIG. 1 shows a schematic representation of a system for trajectory prediction, according to an example embodiment of the present invention.

FIG. 1 shows a schematic representation of a system 200 for trajectory prediction.

In the embodiment shown, the system 200 for trajectory prediction comprises at least one ego vehicle 201 with a computing unit 255. A prediction module 209 and an environmental detector 257 are installed on the computing unit 255. The ego vehicle 201 further comprises at least one environmental sensor 237. The environmental sensor 237 can be used to record environmental sensor data 235 of the surrounding area of the ego vehicle 201, on the basis of which the environmental detector 257 can be used to detect the surrounding area.

The prediction module 209 is further configured to carry out the method for trajectory prediction according to the present invention.

For illustrating the method for trajectory prediction, an exemplary traffic scene is represented in the representation shown. In the exemplary traffic scene, an intersection region of two intersecting roadways 223 is represented. The two roadways 223 in each case have two lanes 224 arranged next to one another. In the traffic scene, four other road users 207 are arranged in the surrounding area of the ego vehicle 201. The road users 207 are arranged on different roadways 223 or lanes 225.

For trajectory planning of the motion trajectories 205 of the other road users 207, the prediction module 209 initially receives trajectory data 203 of at least one motion trajectory 205 of at least one of the other road users 207. According to the present invention, the trajectory data 203 are designed in a graph representation 211. The graph representation 211 comprises a plurality of nodes 213 and a plurality of edges 215 connecting the nodes 213 for representing the motion trajectory 205.

Here, the nodes 213 comprise position information and/or speed information of the particular road user 207 at given points in time. The edges, on the other hand, describe temporal relations of the nodes 213 connected by the particular edges 215. Accordingly, an edge 215 connecting two nodes 213 is used to define the temporal sequence in which the position information and/or speed information of the particular nodes 213 was recorded.

Further, map data 217 of a map representation 219 mapping the surrounding area of the ego vehicle 201 are received by the prediction module 209. In accordance with the present invention, the map data 217 are presented in a graph representation 211. The graph representation 211 comprises a plurality of nodes 213 and edges 215 connecting the nodes 213.

Here, the map representation 219 is an electronic road map of the surrounding area of the ego vehicle. Here, the electronic road map can be designed in a format comparable to the NuScenes data set. In addition, the road map can also be provided with roadway segments and/or lane segments according to the Lanelet2 format.

The nodes 213 of the map data 217 comprise position information of a roadway boundary element 221 of the roadway 223 and or lane 225 used by the particular road user 207.

The edges 215 comprise position-related relative arrangement relations among the particular nodes 213 connected in each case via the edges. The edges 215 can thus be used to define how individual position information of the nodes 213 is arranged relative to one another. Here, the position information defines individual points of the particular roadway boundary element 221. Here, the edges 215 define how the position information is arranged relative to one another, for example one behind the other or next to one another.

For a detailed description of the design of the trajectory data 203 and the map data 217 in corresponding graph representations 211, reference is made to the paper of Grimm et al.: D. Grimm, P. Schörner, M. Dreßler, J.-M. Zöllner, "Holistic graphbased motion prediction," in 2023 IEEE International Conference on Robotics an Automation (CRA), 2023, pp. 2965-2972. The nodes 213 of the trajectory data 203 are designated with "agent-nodes" in the Grimm et al. paper. The nodes 213 of the map data 217 are designated as "map-nodes" in the Grimm et al. paper.

In the embodiment shown, the roadway boundary element 221 is given by a center line of the roadway 223 or lane 225 used by the particular road user 207 for whom a future motion trajectory 205 is to be predicted.

Alternatively, other roadway boundary elements 221, such as edge boundaries or roadway/lane markings, can be taken into account.

According to the present invention, an interaction graph representation 227 is generated based on the trajectory data 203 and the map data 217. The interaction graph representation 227 describes interactions among road users 207. The interactions are represented in the interaction graph 227 via edges 215. The nodes 213 of the interaction graph representation 227 represent the road users 207 arranged in the surrounding area of the ego vehicle 210.

The edges 215 connecting the nodes 213 in the interaction graph representation 227 define position-related relative arrangements of the road users 207 represented by the particular nodes 213 relative to one another. Here, the edges 215 connecting nodes 213 define that the road users 207 represented by the nodes 213 are arranged one behind the other on the same roadway 223 or lane 225; are arranged on different roadways 223 or lanes 225 arranged next to one another; or are arranged on intersecting roadways 223 or lanes 225.

Figures 2A, 2B:
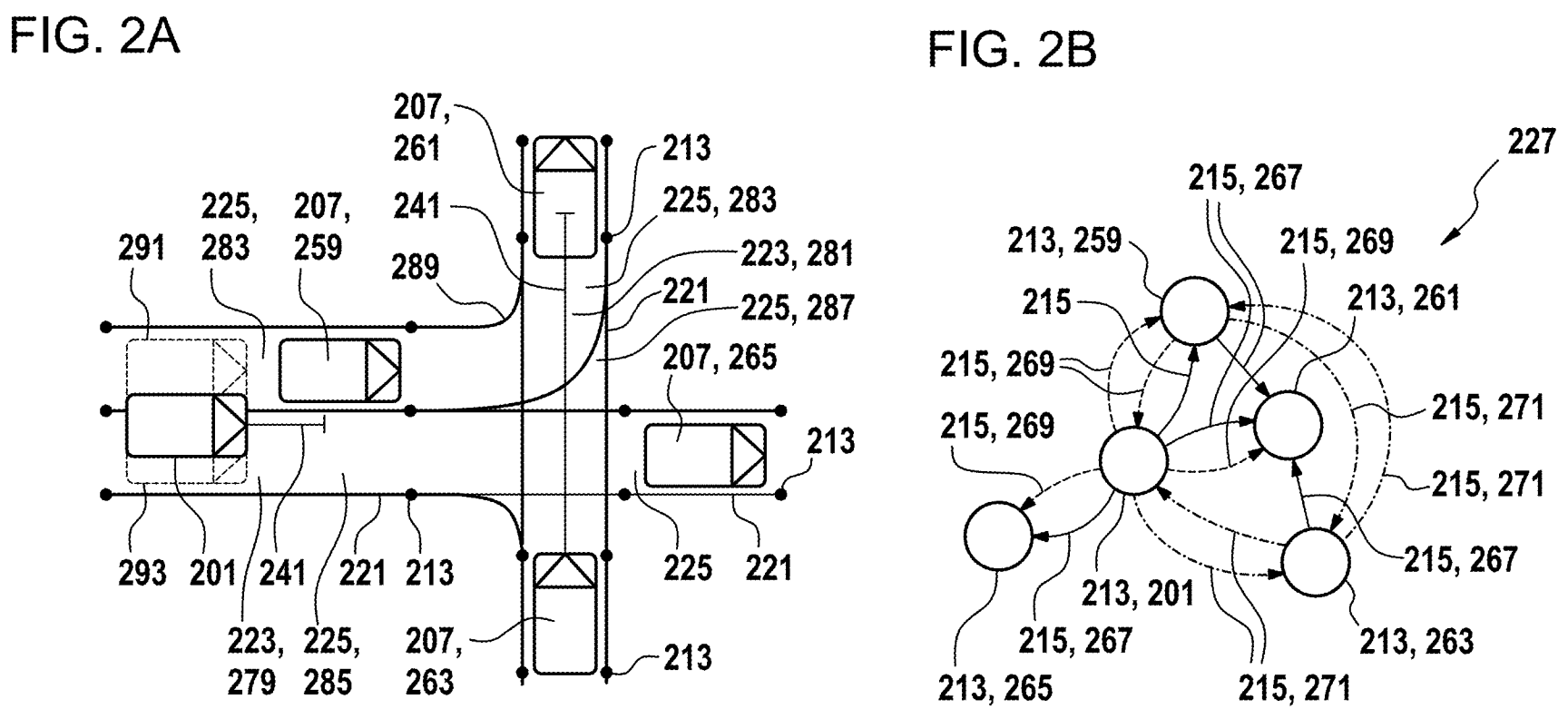

For a detailed description of the interaction graph representation 227, reference is made to the description of FIGS. 2A and 2B.

Based on the trajectory data 203, the map data 217 and the interaction graph representation 227, a motion trajectory 205 to be executed by the particular road user 207 in the future is predicted by the prediction module 209 for at least one road user 207 in the surrounding area of the ego vehicle 201.

Here, the motion trajectory 205 is predicted in such a way that the predicted motion trajectory 205 matches the trajectory data 203 of the particular road user 207. This is understood to mean that the trajectory data 203 of the motion trajectory 205 already executed by a road user 207 and the predicted motion trajectory 205 of the same road user 207 form a continuously running overall trajectory.

Further, taking into account the map data 217, the motion trajectory 205 is predicted in such a way that the predicted motion trajectory follows a course of a roadway 223 or lane 225 defined by the map data 217. This can comprise a change to the roadway and/or lane by the particular road user 207.

For a detailed description of the use of trajectory data 203 and map data 217 for trajectory prediction, reference is once again made to the Grimm et al. paper.

By taking into account the information of the interaction graph representation, the interactions of the various road users 207 can also be taken into account for trajectory prediction.

This is based on the idea that, as a function of the particular road users 207 on the same roadway 223 or lane 225, on roadways 223 or lanes 225 arranged next to one another or on intersecting roadways 223 or lanes 225, the road users 207 show different but characteristic behaviors for the particular arrangement.

This behavior as a function of the arrangement can be learned by the prediction module 209 and thus incorporated into the trajectory prediction.

Furthermore, additional map data 253 can be taken into account by the prediction module 209. Here, further map data 253 is designed as image data and comprises information with respect to roadway characteristics 239.

The roadway characteristics 239 can comprise, for example, the presence of traffic signs, traffic lights, cross-walks, bus stops, construction sites, or similar features of the roadways 223 or lanes 225 surrounding the ego vehicle that are permanent over at least an extended period of time and that can have an influence on the behavior of road users 207 in the surrounding area of the ego vehicle 201.

The prediction module 209 is configured to extract the roadway characteristics 239 from the further map data 253 and take them into account in the trajectory prediction.

According to one embodiment, the prediction module 209 is further configured to generate anchor paths for trajectory prediction. Here, anchor paths describe the spatial regions in which the possible motion trajectories 205 of road users 207 must be arranged. The anchor paths thus form spatial boundaries for the possible motion trajectories 205 of the road users 207. Here, the prediction module 209 is configured to discard motion trajectories 205 in the trajectory prediction that run at least partially outside the anchor paths as invalid motion trajectories 205.

Figure 3:
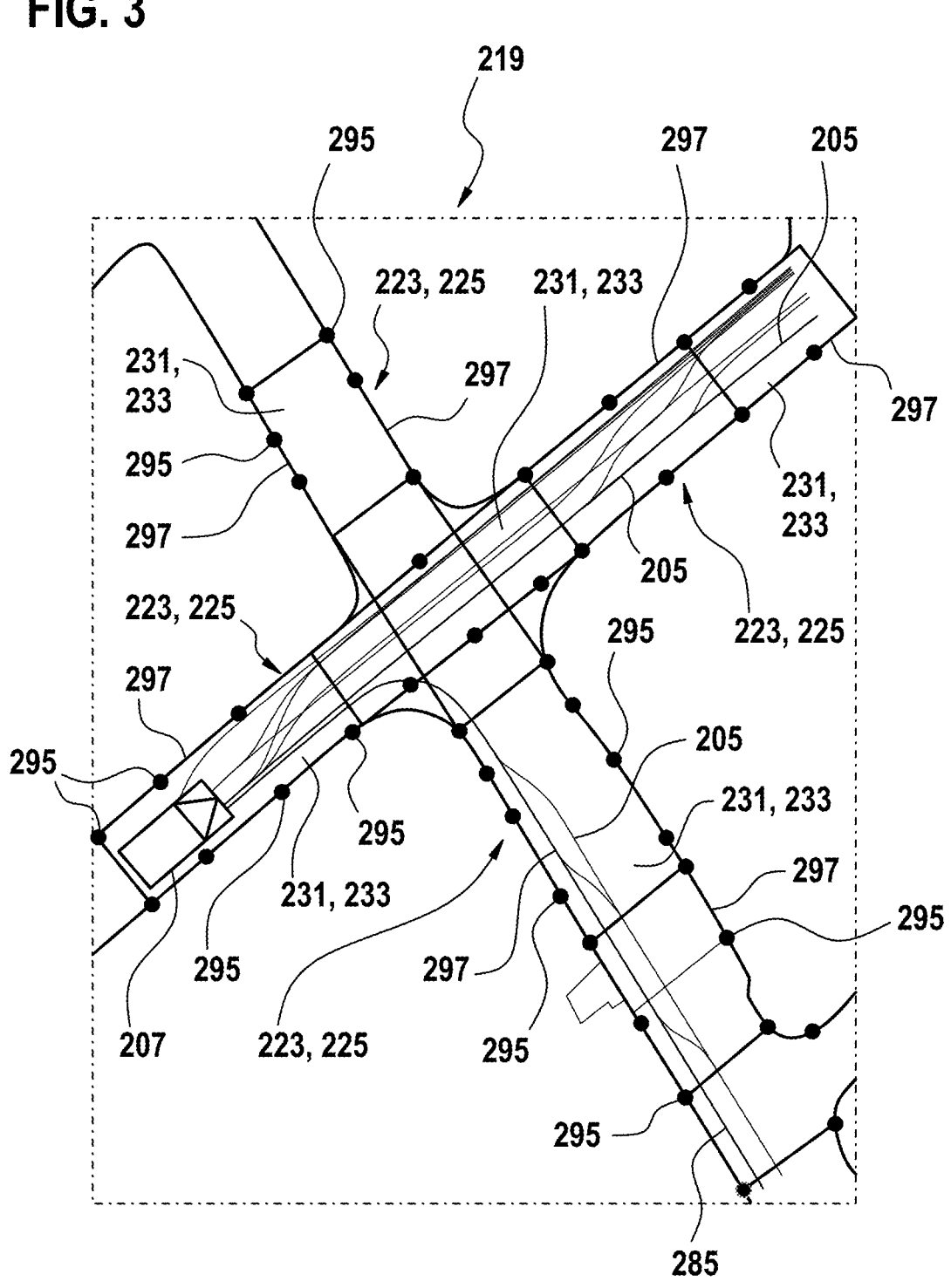
FIG. 3 shows a graphic representation of a generation of anchor paths according to one example embodiment of the present invention.

For a detailed description of the anchor paths, reference is made to the description of FIG. 3.

Furthermore, the prediction module 209 can be configured to ascertain probability values for collisions between the road users 207 among one another or with the ego vehicle 201 based on speed information of the road users 207 and distance information between the road users 207 among one another or among the road users 207 and the ego vehicle 201.

Here, the speed information of the road users 207 can be obtained from the trajectory data 203. The distance information can be obtained from the environmental detector 257 based on the environmental sensor data 235.

For calculating the probability values for collisions, the relative arrangements of the road users 207 of the interaction graph representation 227 can also be taken into account.

The correspondingly ascertained probability values for collisions of the road users 207 can be included in the trajectory prediction by assuming, in the traffic behavior of the road users 207 to be predicted, that the road users 207 will behave in such a way that a collision is avoided.

According to one embodiment, the prediction module 209 is further configured to take into account classifications of the road users 207 in the trajectory prediction.

In the classification, road users 207 can be identified as vehicles, motorcyclists, cyclists, pedestrians or animals, for example.

This type of classification can be used, for example, to generate anchor paths. According to one embodiment, anchor paths are calculated exclusively for road users 207 that may operate primarily or exclusively on roadways 223 or lanes 225. Consequently, no anchor paths are calculated for pedestrians and animals. Optionally, the ascertainment of anchor paths can be limited exclusively to vehicles, so that no anchor paths are generated even for motorcyclists and/or cyclists.

Alternatively, the classification of vehicles can be further detailed and a distinction can be made among passenger cars, trucks, buses or streetcars. This distinction enables further differentiation of the possible behavior of the vehicles. This is based on the justified assumption that a truck is usually expected to behave differently from a passenger vehicle, for example because the truck cannot drive over bridges or underpasses that are easily accessible to a passenger vehicle, or because different traffic rules, such as speed limits or overtaking rules, apply to trucks compared to passenger vehicles.

In addition, further distinctions among different types of passenger vehicles can also be taken into account in order to optionally further differentiate driving behavior, for example as active or passive, sporty or conservative.

The classifications of the road users 207 and the expected traffic behavior can be further taken into account in the trajectory prediction, in order to achieve further refinements of the expected motion trajectories.

The classification of the road users 207 can be effected by the environmental detector 257 based on the environmental sensor data 235 of the environmental sensor 237. Here, the environmental detector 257 can be designed as a trained artificial intelligence.

FIGS. 2A and 2B show a schematic representation of an interaction graph representation 227 according to one embodiment.

In FIG. 2A, the traffic scene from FIG. 1, in which an intersection of a first roadway 279 with a second roadway 281 is shown, is represented once again. Here, the first roadway 279 comprises a first lane 283 and a second lane 285. The second roadway 281 comprises a third lane 287. The first and second roadways 279, 281 intersect in an intersection region. Here, in particular, the second lane 285 of the first roadway 279 and the third lane 287 of the second roadway 281 intersect one another.

The first lane 283 of the first roadway 279, on the other hand, has a change of direction region 289 and merges into the third lane 287 of the second roadway 281 after the change of direction.

A first road user 259 is arranged in the first lane 283 of the first roadway 279. A second road user 261 is arranged in the third lane 287 of the second roadway 281. A third road user 263 is also arranged in the third lane 287 of the second roadway 281, but in the direction of travel behind the second road user 261 and behind the intersection region of the two roadways 279, 281. A fourth road user 265 is arranged in the second lane 285 of the first roadway 279 and in the direction of travel in front of the intersection region.

FIG. 2B shows an interaction graph arrangement 227 mapping the traffic scene in FIG. 2A. In the interaction graph representation 227, the road users 259, 262, 263, 265 and the ego vehicle 201 are represented by the nodes 213. Relationships between the road users 259, 262, 263, 265 among one another and the ego vehicle 201 are defined by the edges 215, via which in each case at least two nodes 213 are connected to one another. Three different arrangements 267, 269, 271 are defined by the edges 215.

The arrangement 267 relates to the case in which at least two road users 207 and/or the ego vehicle 201 are arranged one behind the other on the same roadway 223 and/or lane 225.

The arrangement 269 describes the case in which at least two road users 207 and/or the ego vehicle 201 are arranged next to one another on different roadways 223 and/or lanes 225.

The arrangement 271 describes the case in which at least two road users 207 and/or the ego vehicle 201 are arranged on intersecting roadways 223 and/or lanes 225.

In the traffic scene of FIG. 2A, the first road user 259 is arranged in the first lane 283 of the first roadway 279 in front of the change of direction region 289. The second road user 261 is arranged in the third lane 287 of the second roadway 281 behind the change of direction region 289. In this region, the first lane 283 of the first roadway 279 and the third lane 285 of the second roadway 281 merge into one another. The first and second road users 259, 261 are thus arranged in the same lane.

In FIG. 2B, the first and second road users 259, 261 are consequently connected to one another exclusively via the arrangement 267, which defines an arrangement one behind the other in the same lane. Here, the direction of the arrow of arrangement 267 indicates the sequence of the arrangement of the two road users 259, 261 in relation to the direction of travel. As can be seen in FIG. 2A, the second road user 261 is arranged in front of the first road user 259 in the direction of travel.

Similarly, the second road user 261 and the third road user 263 are arranged one behind the other in the third lane 287 of the second roadway 281. In FIG. 2B, the two road users 261 and 263 are connected to one another exclusively via the arrangement 267.

The third road user 263 and the fourth road user 265, on the other hand, are arranged on the intersecting third lane 287 of the second roadway 281 and second lane 285 of the first roadway 279. In FIG. 2B, the two road users 263, 265 are connected to one another via the arrangement 271, which defines an arrangement on intersecting roadways or lanes. When arranged on intersecting roadways or lanes, no sequence of road users 207 in relation to the direction of travel is taken into account. Therefore, the third and fourth road users 263, 265 are connected to one another via two arrows of the arrangement 271 pointing in opposite directions.

Accordingly, the first road user 259 and the third road user 263 are arranged on the intersecting first lane 283 of the first roadway 279 and third lane 287 of the second roadway 281. Since the third road user 263 is located on the third lane 287 of the second roadway 281 in front of the intersection region and thus in front of the region in which the first lane 283 of the first roadway 279 merges into the third lane 287 of the second roadway 281, the first road user 259 and the third road user 263 are arranged on intersecting roadways 223 or lanes 225.

Accordingly, the road users 259, 263 are connected in the graph representation in FIG. 2B by the arrangement 271 in the form of two arrows pointing in opposite directions.

According to one embodiment, the determination of the position of the ego vehicle 201 is undertaken with a probability value. For determining the position of the ego vehicle 201, a plurality of results with a probability can thus be ascertained. This is represented in FIG. 2A by the two dashed lines. Through the dash-lined markings, a first position 291 on the first lane 283 of the first roadway 279 and a second position 293 on the second lane 285 of the first roadway 279 of the ego vehicle 201 are defined.

In the traffic scene shown, the ego vehicle 201 is arranged to a greater extent in the second lane 285 of the first roadway 279. Thus, the second position 293 would have a higher probability value than the first position 291.

Alternatively or additionally, more than two positions with corresponding probability values can be output as results of the determination of the position.

According to the probability values of the first and second positions 293, 293, the ego vehicle 201 is arranged in the same first lane 283 as the first road user 259 or in the second lane 285 and thus next to the first road user 259. Accordingly, in the interaction graph representation 227 of FIG. 2B, the two nodes 213 of the ego vehicle 201 and the first road user 259 are connected to one another via the two arrangements 267, 269.

Accordingly, in the first position 291 the ego vehicle 201 is arranged in the same lane 283 as the second road user 261 and in the second position 293 in the second lane 285 and thus next to the second road user 261. In the interaction graph representation 227, the nodes 213 of the ego vehicle 201 and the second road user 261 are thus connected via the arrangements 267, 269.

The same applies to the fourth road user 265. Due to the two possible positions 291, 293, the ego vehicle 201 is either in the same lane 285 as or in the lane 283 adjacent to the fourth road user 265. In the interaction graph representation 227 of FIG. 2B, the nodes 213 of the ego vehicle 201 and of the fourth road user 265 are connected via the arrangements 267, 269.

With respect to the third road user 263, there is no difference between the two positions 291 and 293 of the ego vehicle 201. In both positions 291, 293, the ego vehicle 201 is arranged on a lane 283, 285 crossing the third lane 287 of the second roadway 281. In the interaction graph representation 227 of FIG. 2B, the nodes 213 of the ego vehicle 201 and the third road user 263 are thus connected exclusively via the arrangement 271.

In FIG. 2A, distances 241 between the ego vehicle 201 and the road users 207 or between the road users 207 among themselves are also represented. As described with respect to FIG. 1, probability values for possible collisions between the road users 207 among themselves or with the ego vehicle 201 can be calculated based on the distances 241 and the speed values of the ego vehicle 201 and/or the road users 207, taking into account the arrangement relations of the interaction graph representation 227.

In FIG. 2A, the distances 241 between the ego vehicle 201 and/or the road users 207 are defined from the center point of one road user 207 to the center point of the in each case other road user 207 of the ego vehicle 201. However, other distance definitions are also conceivable.

The traffic scene represented in FIGS. 2A and 2B is merely exemplary. According to the present invention, any traffic scenes can be taken into account in the interaction graph representation 227.

The determinations of the position of the road users 207 on the particular roadways 223 and/or lanes 225 in the surrounding area of the ego vehicle 201 are effected based on the received trajectory data 203 and the map data 217. Via the position information of the trajectory data 203 and the information of the map representation, the road users 207 can be identified as positioned on the particular roadways 223 or lanes 225.

The trajectory data 203, and in particular the position information of the trajectory data 203, can be generated via the environmental sensor data 235 and the analysis of the environmental detector 257, as described above. The road users 207 in the surrounding area and on the roadways 223 or lanes 225 can be recognized and localized via the environmental detector 257.

Alternatively or additionally, trajectory data 203 of the road users 207 can be transmitted directly from the road users 207 to the ego vehicle 201 via car-2-car communication.

The road users 207 can be identified as positioned on the corresponding roadways 223 or lanes 225 by comparing them with the information in the map representation.

The information of the interaction graph representation 227 can be incorporated into the trajectory prediction as follows. Here, the idea is that the behavior of the various road users 207 arranged in the surrounding area of the ego vehicle 201 depends on the relative behavior of the road users 207 to one another.

For example, with the arrangement of two road users 207 in the same lane 225, a reduction in the speed of the rear road user 207 or a lane change by the rear road user 207 can be assumed if the rear road user 207 is faster than the front road user 207.

However, if both road users 207 are arranged in two lanes 225 arranged next to one another, a change in speed or a lane change by one of the road users 207 is not to be expected immediately.

However, with an arrangement of two road users 207 on intersecting roadways 223 or lanes 225, a speed reduction is to be assumed prior to entry of the intersection region.

The trajectory prediction can thus be improved by the additional information of the interaction graph representation 227.

For a detailed description of the generation and use of the interaction graph representation 227 for trajectory prediction, reference is made to the article by Zipfl et al.: M. Zipfl, F. Hertlein, A. Rettinger S. Thoma, L. Halilaj, J. Luettin, S. Schmid, C. Henson, "Relation-based Motion Prediction using Traffic Scene Graphs", arXiv:2212.02503. The interaction graph representation is referred to as the "traffic scene graph" in the Zipfl et al. paper.

FIG. 3 shows a graphic representation of a generation of anchor paths 229.

FIG. 3 illustrates the generation of anchor paths 229 in the method for trajectory prediction. The anchor paths 229 are generated only for road users 207 that have been identified as vehicles of any configuration and recognized as being positioned on roadways 223 or lanes 225.

For generating the anchor paths 229, a map representation 219 of the road traffic network formed in the surrounding area of the ego vehicle 201 is initially provided. Here, the map representation 219 is designed as an electronic road map, maps the roadways 223 and/or lanes 225 in the surrounding area of the ego vehicle 201 and represents roadway segments 231 of the roadways 223 and/or lane segments 233 of the lanes 225 in Lanelet2 format.

The roadway segments 231 or lane segments 233 of the Lanelet2 format in each case comprise nodal points 295 and at least two line elements 297. The line elements 297 comprise the nodal points 295 and in each case represent the right or left boundaries of the particular roadway segment 231 or lane segment 233. The roadway segments 231 or lane segments 233 form a roadway 223 or lane 225 in the map representation 219 accordingly. Here, the roadway segments 231 or lane segments 233 can form an entire roadway 223 or lane 225 or only parts of the roadway 223 or lane 225. Here, the line elements 297 form the edge boundaries of the mapped roadway 223 or lane 225.

The roadway segments 231 or lane segments 233 can further comprise roadway identity elements or lane identity elements. The particular roadway segments 231 or lane segments 233 can be uniquely identified via the roadway identity elements or lane identity elements.

Subsequently, at least one road user 207 is ascertained in the surrounding area of an ego vehicle 201. The ego vehicle 201 is not represented in FIGS. 2A and 2B.

Subsequently, the particular road user 207 is mapped to the roadway segment 231 or lane segment 233 of the map representation 219, in which the road user 207 is arranged at the point in time of the execution of the generation of the anchor paths 229.

Subsequently, roadway anchors or lane anchors are ascertained. The roadway anchors or lane anchors comprise a plurality of further roadway segments 231 or lane segments 233 which are connected in the map representation 219 to the roadway segment 231 or lane segment 233 in which the road user 207 is arranged, and in which motion trajectories 205 can run.

Here, the motion trajectories 205 can then run through a corresponding roadway segment 231 or lane segment 233 if this generates a motion trajectory 205 with a contiguous or continuously running course that corresponds to the prevailing traffic rules and is suitable for controlling a corresponding road user 207.

For this purpose, the roadway anchors or lane anchors can in each case comprise a plurality of roadway identity elements or lane identity elements.

The roadway anchors or lane anchors can be limited to a maximum length, for example 100 meters.

Subsequently, at least one possible motion trajectory 205 of the road user 207, which at least runs through a part of the further roadway segments 231 or lane segments 233 connected to the roadway segment 231 or lane segment 233 in which the road user 207 is arranged, is ascertained.

For this purpose, the roadway anchors or lane anchors can be used to generate the anchor paths 229 and 128 dimensional anchor embeddings. Here, the anchor embeddings are latent space representations of the roadway anchors or lane anchors and are generated by the prediction module 209, which is designed as an artificial intelligence, in particular as a graph neural network GNN. Here, latent space representations are vector representations in a latent space of artificial intelligence. Here, the anchor embeddings can be generated by the GNN using the position information of the trajectory data 203, the map data 217 and the roadway anchors or lane anchors.

In a trajectory decoder of the GNN, the information of the road user 207 can be copied k times, with $k \in [0,9]$. Subsequently, the information of the road user 207 can be linked with the anchor embeddings and used for trajectory prediction.

$$T = MPLP(\text{concat}(z_{user}, z_{anchor}))$$

Here, T is the motion trajectory 205, z_user is the latent space representation of the particular road user 207 and z_anchor is the latent space representation of the roadway anchor or lane anchor or the anchor embedding.

In FIG. 3, a variety of possible motion trajectories 205, which satisfy the anchor paths 229 and can be executed by the road user 207, is represented. The plurality of possible motion trajectories 205 can further be reduced to a predetermined number of motion trajectories 205 that are as diverse as possible. Redundant motion trajectories 205 may not be taken into account here.

The anchor paths 229 generated in this way serve as spatial boundaries for possible motion trajectories 205. The motion trajectories 205 predicted in the trajectory prediction for the various road users 207 must be located within the anchor paths 229 generated for the particular road users 207.

By taking into account the anchor paths 229, the prediction module 209 is trained to generate only motion trajectories 205 that run within the anchor paths 229 generated for the particular road users 207.

The anchor paths 229 can be designed as polylines with 2D position information.

Figure 4:
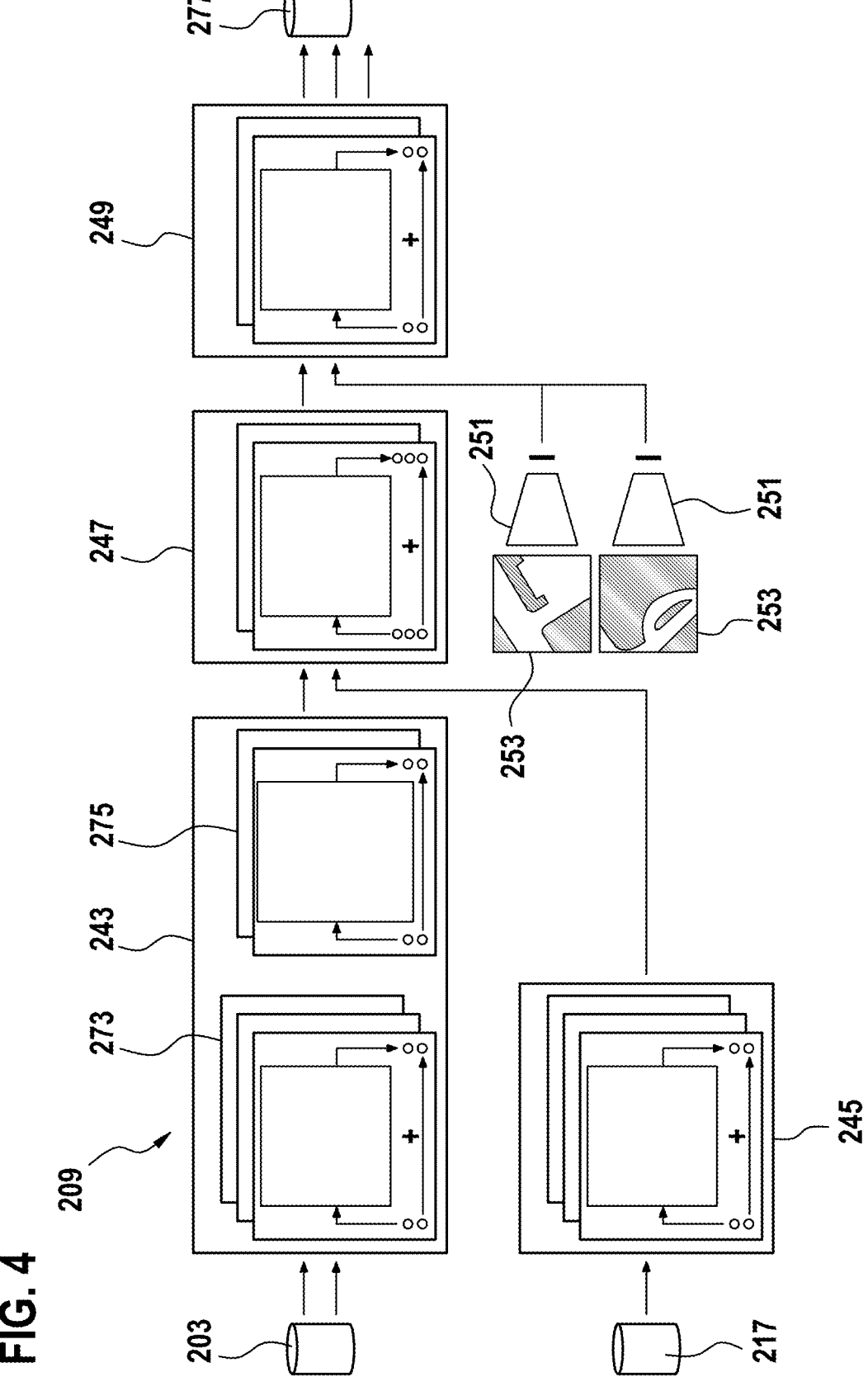
FIG. 4 shows a schematic representation of a prediction module according to one example embodiment of the present invention.

FIG. 4 shows a schematic representation of a prediction module 209 according to one embodiment.

According to one embodiment, the prediction module 209 is configured as an artificial intelligence that is trained to execute the method for trajectory prediction according to the present invention.

The prediction module 209 can, for example, be designed as an appropriately trained graph neural network GNN.

In the embodiment shown, the prediction module 209 comprises a user level 243, a map level 245, a fusion level 247, a merger level 249, and two encoder elements 251.

The trajectory data 203 is processed in graph representation via the user level 243. Furthermore, the interaction graph representation 227 is generated in the user level 243 based on the trajectory data 203 and taking into account information from the map representation with respect to the courses and positions of the particular roadways 223 and lanes 225.

In the embodiment shown, the user level 243 comprises a first sub-level 273 and a second sub-level 275. In the first sub-level 273, the trajectory data 203 of the various road users 207 are processed. In the second sub-level 275, the interaction graph representation 227 is generated based on the results of the first sub-level 273.

In the map level 245, the map data 217 are processed in graph representation.

The results of the user level 243 and the map level 245 are combined in the fusion level 247. In the fusion level 247, the anchor paths 229 are also generated based on the results of the user level 243 and the map level 245.

The encoder elements 251 are configured to read in the further map data 253 in image format and to extract the roadway characteristics 239. For example, the encoder elements 251 can be designed as part of an autoencoder with the encoder elements 251 and corresponding decoder elements.

In the merger level 249, the results of the fusion level 247 and the encoder elements 251 are processed and the motion trajectories 205 are predicted based on this. The trajectory prediction is thus effected based on the trajectory data 203, the map data 217 and taking into account the information of the interaction graph representation 227, the anchor paths 229 and the roadway characteristics 239. The predicted motion trajectories 205 are output by the merger level 249 as output data 277.

The image data of the further map data 253 can be based on a map representation comparable to the NuScenes data set. Here, roadway segments 231 and/or lane segments 233 in the sense of the Lanelet2 format can also be integrated into the map representation using the encoder elements 251 as autoencoders.

The 10-channel images of the image data of the further map data 253 can further be converted into latent space representations by the autoencoders of the encoder elements 251. Here, latent space representations are understood to mean vector representations of the information of the further map data 253 in the latent space of the encoder elements 251.

Here, the architecture of the autoencoders of the encoder elements 251 can be designed in such a way that the encoder elements 251 are configured to encode the 10 binary masks of the image data of the further map data 253 into 128 dimensional latent space representations in the 10×128×128 format.

For this purpose, the encoder elements 251 can comprise six layers, wherein each layer comprises a 2D convolution, a batch normalization and a LeakyReLu activation.

The decoder elements of the autoencoders can also comprise six layers, wherein the first five layers in each case comprise 2D deconvolutions, batch normalizations and ReLU activations. In the last layer, a Tanh function can be used as an activation function.

The 128×128 dimensional image data of the further map data 253 can cover a 50 m×50 m spatial region of the surrounding area of the ego vehicle 201.

The autoencoders can be trained for 100 epochs with a learning rate of $2.10^{\wedge}(-4)$ and an MSE reconstruction loss of 0.59.

The nodes 213 of the graph representation of the trajectory data 203 can also be provided with additional map information. For this purpose, latent space representations of a local cut-out region of the map representation of a surrounding area of the particular road user 207 can be added to the node 213 representing the particular road user 207 in the graph representation of the trajectory data 203.

$$n^* = MLP(concat(n, dropout(z_{map})))$$

Here, $n^*$ is the node 213 of the particular road user 207 provided with map information, while n describes the original node 213. On the other hand, $z_{map}$ describes the cut-out region of the map representation.

A drop-out rate of 0.5 can be used to avoid overfitting. Here, the cut-out region can be centered around the particular road user 207 in the map representation and rotated in such a way that a direction of motion points in a northerly direction.

The trajectory prediction by the prediction module 209 designed as a trained artificial intelligence is further executed with a loss function. Here, the loss function can be defined as follows:

$$L = L_{req} + W_1 L_{score} + W_2 L_{yaw}$$

Here, L is the loss function, L_reg is the regression loss, L_score is the scoring loss, L yaw is the orientation loss and w_1, w_2 are parameters. Here, the regression loss can be designed as a continuous L1 loss. The scoring loss can be designed as a max-margin loss. Here, the regression loss and the scoring loss are only evaluated for the predicted motion trajectories 205 with the smallest final displacement error to a ground truth trajectory.

By comparing the orientations of the predicted motion trajectories 205 with the orientations of the anchor paths 229, the prediction module 209 can be made to predict only motion trajectories 205 that follow the anchor paths 229.

The orientation loss can also be expressed in this way:

$$L_{yaw} = 1 - \cos(\theta_{anchor} - \theta)$$

Here, the angle $\theta$ is defined in $(-\pi, \pi]$.

The architecture of the prediction module 209 shown in FIG. 4 is merely exemplary. The architecture can also be designed differently.

FIG. 5 shows a flow chart of a method 100 for trajectory prediction.

In a first method step 101, trajectory data 203 of motion trajectories 205 of road users 207 arranged in the surrounding area of the ego vehicle 201 are initially received by the prediction module 209. Here, the trajectory data 203 are arranged in a graph representation 211, wherein nodes 213 of the graph representation 211 comprise position information and/or speed information of the road users 207, and wherein edges 215 of the graph representation 211 define temporal relations between the position information and/or speed information of the road users 207.

In a further method step 103, map data 217 of the map representation 219 mapping the surrounding area of the ego vehicle 201 are received by the prediction module 209. Here, the map data 217 are arranged in a graph representation 211, wherein the nodes 213 of the graph representation 211 comprise position information of a roadway boundary element 221 of the roadway 223 and/or lane 225 used by the ego vehicle 201 and/or by the other road users 207. Here, the edges 215 of the graph representation 211 define spatial relations between the position information of the roadway boundary element 221.

In a further method step 105, an interaction graph representation 227 for the plurality of road users 207 based on the trajectory data 203 of the road users 207 and roadway location information of the map representation 219 is generated by the prediction module 209. Here, the nodes 213 of the interaction graph representation 227 in each case represent a road user 207 positioned in the surrounding area of the ego vehicle 201 and comprise position information and/or speed information of the road user 207. The edges 215 of the interaction graph representation 227 in each case define arrangement relations among the road users 207 represented by the nodes 213.

In a further method step 117, a further road user 207 is classified as one of the following list based on environmental sensor data 235 from at least one environmental sensor 237 of the ego vehicle 201 by the environmental detector: vehicle, bus, truck, tram, motorcyclist, bicyclist, pedestrian, animal.

In a further method step 119, further map data 253 of a map representation 219 mapping the surrounding area of the ego vehicle 201 are received by the prediction module 209. Here, the further map data 253 are designed as image data.

In a further method step 121, from the further map data 253, lane characteristics 239 of the roadways 223 used by the road users 207 are read out by the prediction module 209.

In a further method step 109, based on the trajectory data 203 of the road users 207 and the map data 217 of the map representation 219, anchor paths 229 are generated by the prediction module 209. Here, anchor paths 229 define regions on the roadways 223 used by the road users 207 in which possible motion trajectories 205 can be arranged.

For this purpose, at least one road user 207 on a roadway 223 and/or lane 225 is identified by the prediction module 209 in a further method step 111.

In a further method step 113, a roadway segment 231 and/or a lane segment 233 of the roadway 223 and/or lane on which the road user 207 is positioned are identified by the prediction module 209. Here, roadway segment 231 and/or lane segment 233 defines a partial region of the roadway 223 and/or lane 225 and is bounded by roadway boundary elements 221 of the roadway 223 and/or lane boundary elements of the lane 225. The roadway segment 231 can also be connected to further roadway segments 231 and/or the lane segment 233 can be connected to further lane segments 233. Here, a plurality of roadway segments 231 and/or a plurality of lane segments 233 form the roadway 223 and/or the lane 225.

In a further method step 115, the roadway segment 231 and/or the lane segment 233 is connected to further roadway segments 231 and/or lane segments 233, each of which can be connected to one another, to form the anchor path 229, taking into account prevailing traffic rules and a course of the roadway 223 and/or lane 225.

In a further method step 107, based on the trajectory data 203, the map data 217, the interaction graph representation 227, the road user 207 and the further map data 253 are predicted by the prediction module 209.

For this purpose, in a further method step 123, distances 241 of the road users 207 to other road users 207 and/or to the ego vehicle 201 are ascertained based on the position information and the lane information of the interaction graph representation 227 for road users 207 in the surrounding area of the ego vehicle 201.

In a further method step 125, probability values for collisions of the road users among one another or with the ego vehicle 201 are calculated based on the distances 241 and speed information of the road users 207. Here, the probability values are taken into account when predicting the motion trajectories 205.

FIG. 6 shows a flow chart of a method 100 for controlling an ego vehicle 201.

In a first method step 301, a trajectory prediction according to the method 100 for trajectory prediction for a vehicle according to one of the above-described embodiments is initially executed.

Subsequently, in a further method step 303, at least one control function of the ego vehicle 201 is executed taking into account the predicted motion trajectory 205 of the ego vehicle 201.

FIG. 7 shows a schematic representation of a computer program product 400, comprising commands that, when the program is executed by a data processing unit, cause the data processing unit to execute the method 100 for trajectory prediction and/or the method 300 for controlling an ego vehicle 201.

In the embodiment shown, the computer program product 400 is stored on a computing unit or a storage medium 401. Here, the storage medium 401 can be any storage medium from the related art.

What is claimed is:

1. A computer-implemented method for trajectory prediction, comprising the following steps:

receiving, by a prediction module, trajectory data of motion trajectories of road users arranged in a surrounding area of an ego vehicle, wherein the trajectory data are arranged in a graph representation, wherein nodes of the graph representation include position information of the road users and/or speed information of the road users, and wherein edges of the graph representation define temporal relations between the position information of the road users and/or the speed information of the road users;

receiving, by the prediction model, map data of a map representation mapping the surrounding area of the ego vehicle, wherein the map data are arranged in a graph, wherein nodes of the graph representation include position information of a roadway boundary element of a lane and/or lane, used by the ego vehicle and/or by other road users, and wherein edges of the graph representation define spatial relations between the position information of the roadway boundary element;

generating, by the prediction model, an interaction graph representation for the road users based on the trajectory data of the road users and the position information of the roadway boundary elements of the map representation, wherein each node of the interaction graph representation represents a road user positioned in the surrounding area of the ego vehicle and includes position information and/or speed information of the road user, and wherein each edge of the interaction graph representation defines an arrangement relation between two of the road users represented by the nodes; and predicting, by the prediction module, a future motion trajectory to be executed for at least one other road user based on the trajectory data, the map data, and the interaction graph representation of the road users.

2. The method according to claim 1, further comprising the following:

generating, by the prediction module, anchor paths based on the trajectory data of the road users and the map data of the map representation, wherein the anchor paths define regions on roadways used by the road users in which possible motion trajectories can be arranged;

wherein the prediction of the future motion trajectory is effected based on the trajectory data, and/or the map data, and/or the interaction graph representation of the road users, and/or the anchor paths.

3. The method according to claim 2, wherein the generating of the anchor paths includes:

localizing, by the prediction module, at least one road user on a roadway and/or lane;

identifying a roadway segment and/or lane segment of the roadway and/or lane on which the road user is positioned, wherein the roadway segment and/or lane segment defines a partial region of the roadway and/or lane, wherein the roadway segment and/or the lane segment is bounded by roadway boundary elements of the roadway and/or lane boundary elements of the lane, wherein the roadway segment can be connected to further roadway segments and/or the lane segment can be connected to further lane segments, and wherein a plurality of roadway segments forms the roadway and/or a plurality of lane segments (233) forms the lane; and connecting the roadway segment and/or the lane segment to further roadway segments and/or lane segments, each of which can be connected to one another, to form the anchor path, taking into account prevailing traffic rules and a course of the roadway and/or lane.

4. The method according to claim 3, wherein the anchor path includes a roadway change and/or a lane change, provided that a roadway change and/or a lane change is compatible with the course of the roadway and/or lane and with prevailing traffic rules.

5. The method according to claim 2, further comprising the following:

classifying the other road users based on environmental sensor data of at least one environmental sensor of the ego vehicle by defining an environmental detection as one of the following list: vehicle, bus, truck, streetcar, motorcyclist, cyclist, pedestrian, animal;

wherein anchor paths are generated only for road users, which are classified as vehicle, bus, truck, streetcar, motorcyclist.

6. The method according to claim 1, further comprising the following:

receiving, by the prediction module, further map data of a map representation mapping the surrounding area of the ego vehicle, wherein the further map data are image data; and reading out, by the prediction module, roadway characteristics of roadways used by the road users from the further map data;

wherein the prediction of the future motion trajectories is effected based on the trajectory data, the map data, the interaction graph representation of the road users, and the roadway characteristics.

7. The method according to claim 6, wherein the roadway characteristics include the following: stop lines, traffic signs, traffic lights, crosswalks, roadway environments, sidewalks, parking lots.

8. The method according to claim 6, wherein arrangement relations of the edges of the interaction graph representation include lane information with respect to the road users, and wherein the lane information includes lane information:

that a road user is positioned in the same lane as another road user and/or the ego vehicle, and/or that a road user is positioned in a lane adjacent to the lane of the other road user and/or the ego vehicle, and/or that a road user is positioned in a lane that crosses the lane of the other road user and/or the ego vehicle; and wherein the prediction of the future motion trajectories is effected based on the trajectory data, the map data, the interaction graph representation of the road users, the roadway characteristics, and the arrangement relations of the interaction graph representation.

9. The method according to claim 8, wherein the predicting of the motion trajectories includes the following:

ascertaining for road users in the surrounding area of the ego vehicle distances of the road users to other road users and/or to the ego vehicle, based on the position information and lane information of the interaction graph representation;

ascertaining probability values for collisions of road users among one another or with the ego vehicle based on the distances and speed information of the road users; and wherein the motion trajectories are effected taking into account the ascertained probability values.

10. The method according to claim 1, wherein the nodes of the interaction graph representation include information with respect to a type of the road user, and wherein the type is defined as one of the following list: vehicle, bus, truck, motorcyclist, cyclist, pedestrian, animal.

11. The method according to claim 1, wherein the prediction module is an artificial intelligence that is trained to execute the steps of the method, wherein the prediction module includes a user level, a map level, a fusion level, a merger level, and at least one encoder element, wherein the user level is configured to process the trajectory data and/or to generate the interaction graph representation, wherein the map level is configured to process the map data, wherein the fusion level is configured to fuse results of the user level and the map level, wherein the at least one encoder element is configured to process further map data including mage data and to extract roadway characteristics and/or lane characteristics from the map data, and wherein the merger level is configured to predict and output at least one motion trajectory of at least one road user based on results of the fusion level and results of the encoder element.

12. The method according to claim 11, wherein the artificial intelligence includes at least one graph neural network, and/or wherein the encoder element is an autoencoder and is configured to generate a latent space representation in a latent space of the roadway characteristics based on the image data of the further map data.

13. The method according to claim 1, further comprising:
executing at least one control function of the ego vehicle taking into account the predicted driving trajectory of the vehicle.

14. A computing unit for trajectory prediction, the computing unit configured to:
receive, by a prediction module, trajectory data of motion trajectories of road users arranged in a surrounding area of an ego vehicle, wherein the trajectory data are arranged in a graph representation, wherein nodes of the graph representation include position information of the road users and/or speed information of the road users, and wherein edges of the graph representation define temporal relations between the position information of the road users and/or the speed information of the road users;
receive, by the prediction model, map data of a map representation mapping the surrounding area of the ego vehicle, wherein the map data are arranged in a graph, wherein nodes of the graph representation include position information of a roadway boundary element of a lane and/or lane, used by the ego vehicle and/or by other road users, and wherein edges of the graph representation define spatial relations between the position information of the roadway boundary element;
generate, by the prediction model, an interaction graph representation for the road users based on the trajectory data of the road users and the position information of the roadway boundary elements of the map representation, wherein each node of the interaction graph representation represents a road user positioned in the surrounding area of the ego vehicle and includes position information and/or speed information of the road user, and wherein each edge of the interaction graph representation defines an arrangement relation between two of the road users represented by the nodes; and
predict, by the prediction module, a future motion trajectory to be executed for at least one other road user based on the trajectory data, the map data, and the interaction graph representation of the road users.

15. A non-transitory computer-readable storage medium on which is stored a computer program including commands for trajectory prediction, the commands, when executed by a data processor, causing the data processor to perform the following steps:
receiving, by a prediction module, trajectory data of motion trajectories of road users arranged in a surrounding area of an ego vehicle, wherein the trajectory data are arranged in a graph representation, wherein nodes of the graph representation include position information of the road users and/or speed information of the road users, and wherein edges of the graph representation define temporal relations between the position information of the road users and/or the speed information of the road users;
receiving, by the prediction model, map data of a map representation mapping the surrounding area of the ego vehicle, wherein the map data are arranged in a graph, wherein nodes of the graph representation include position information of a roadway boundary element of a lane and/or lane, used by the ego vehicle and/or by other road users, and wherein edges of the graph representation define spatial relations between the position information of the roadway boundary element;
generating, by the prediction model, an interaction graph representation for the road users based on the trajectory data of the road users and the position information of the roadway boundary elements of the map representation, wherein each node of the interaction graph representation represents a road user positioned in the surrounding area of the ego vehicle and includes position information and/or speed information of the road user, and wherein each edge of the interaction graph representation defines an arrangement relation between two of the road users represented by the nodes; and
predicting, by the prediction module, a future motion trajectory to be executed for at least one other road user based on the trajectory data, the map data, and the interaction graph representation of the road users.

* * * * *